(12) United States Patent
Rayner

(10) Patent No.: US 6,239,804 B1
(45) Date of Patent: May 29, 2001

(54) DEVICE AND METHOD FOR ACCURATELY OBTAINING MEASUREMENT DATA FOR POOL COVERS AND OTHER OBJECTS

(76) Inventor: Marlene Rayner, 1260 N. Lyle, Elgin, IL (US) 60123

( * ) Notice: Subject to any disclaimer, the term of this patent is extended or adjusted under 35 U.S.C. 154(b) by 0 days.

(21) Appl. No.: 09/188,638

(22) Filed: Nov. 9, 1998

(51) Int. Cl.[7] .................................................. G06T 17/00
(52) U.S. Cl. ............................................ 345/418; 345/441
(58) Field of Search .................................... 345/418, 419, 345/433, 440, 441, 442, 443

(56) References Cited

U.S. PATENT DOCUMENTS 5,926,568 * 7/1999 Chaney et al. ...................... 382/217

OTHER PUBLICATIONS

Pattern Smith Tutorial, Autometrix 916/477–5065 Safety Mesh & Solid Pool Covers 2000 Retail Price List & Measurement Guide.

* cited by examiner

Primary Examiner—Cliff N. Vo
(74) Attorney, Agent, or Firm—Niro, Scavone, Haller & Niro

(57) ABSTRACT

The present invention provides a device and method for visually confirming at a work site the accuracy of measurements representing the shape of an object. Include is a microprocessor into which a plurality of measurements representing a plurality of reference points corresponding to the shape of the object is inputted. The device and method may also display a plurality of the reference points, either individually or as connected line segments corresponding to the measurements, This allows for the visual confirmation of the accuracy of the measurements by comparing the image displayed with the shape of the object. In addition, this may also permit an operator to notice an incorrect measurement input and make the appropriate correction.

9 Claims, 4 Drawing Sheets

FIG. 1

COMPANY:
ADDRESS:

PHONE:      FAX:
EMAIL:

CONTACT NAME:

JOB NAME OR P.O.#: GOOD A/B

MEASUREMENT TYPE:
A-B LINE LENGTH: 15 FT. 8 IN.

DIAGONAL DISTANCES:

AB FILE NAME: F:\PSMITH\97ABL\KENDALL2.ABL          FREE 10

| PT # | DIST TO A | DIST TO B |
|---|---|---|
| 1  | 12, 10 | 11, 2  |
| 2  | 11, 9  | 12, 4  |
| 3  | 10, 1  | 13, 7  |
| 4  | 8, 1   | 14, 5  |
| 5  | 6, 5   | 15, 6  |
| 6  | 6, 1   | 17, 3  |
| 7  | 6, 9   | 19, 1  |
| 8  | 8, 4   | 21, 2  |
| 9  | 9, 8   | 22, 6  |
| 10 | 10, 11 | 23, 9  |
| 11 | 11, 2  | 24, 3  |
| 12 | 11, 1  | 24, 7  |
| 13 | 11, 1  | 25, 1  |
| 14 | 11, 8  | 25, 12 |
| 15 | 12, 7  | 27, 1  |
| 16 | 13, 9  | 28, 3  |
| 17 | 14, 10 | 29, 3  |
| 18 | 15, 10 | 29, 12 |
| 19 | 16, 7  | 30, 3  |
| 20 | 16, 8  | 29, 12 |
| 21 | 16, 6  | 29, 4  |
| 22 | 16, 2  | 28, 8  |
| 23 | 15, 9  | 27, 12 |
| 24 | 15, 9  | 27, 9  |
| 25 | 16, 2  | 27, 11 |
| 26 | 16, 7  | 28, 3  |
| 27 | 18, 2  | 29, 6  |
| 28 | 19, 8  | 30, 6  |
| 29 | 21, 2  | 31, 10 |
| 30 | 22, 9  | 32, 12 |
| 31 | 24, 6  | 34, 4  |
| 32 | 25, 5  | 34, 10 |
| 33 | 26, 3  | 34, 10 |
| 34 | 26, 3  | 33, 12 |
| 35 | 26, 5  | 33, 6  |
| 36 | 27, 1  | 33, 3  |
| 37 | 28, 0  | 33, 4  |
| 38 | 28, 11 | 33, 6  |
| 39 | 29, 8  | 33, 7  |
| 40 | 29, 11 | 33, 7  |
| 41 | 29, 10 | 33, 2  |
| 42 | 29, 6  | 32, 2  |
| 43 | 29, 1  | 30, 12 |

AB FILE NAME: F:\PSMITH\97ABL\KENDALL2.ABL

LENGTH = 43 FT. 1.10 IN.   WIDTH = 27 FT. 6.30 IN.

A ———————————— B
15 FT. 8 IN.

DEVICE AND METHOD FOR ACCURATELY OBTAINING MEASUREMENT DATA FOR POOL COVERS AND OTHER OBJECTS

BACKGROUND OF THE INVENTION

The invention relates to a portable device and method for compiling and storing data relating to the dimensional measurements of an object that are then later used to reproduced the shape of the object at an off-site manufacturing facility. Visual verification of the accuracy of the measurement data is provided at the work site so as to minimize costly measurement related errors. The device may be used with two and three dimensional objects.

SUMMARY OF THE INVENTION

The invention relates to a method and device for accurately taking measurements corresponding to the shape of an object and which are later used to recreate the object's shape at a remote location. Virtually error free measurement data is obtained by providing on-site visual verification of the measurement data taken. The device includes a portable microprocessor in which measurement data is inputted via a keyboard. The microprocessor includes software for receiving, storing and processing the inputted data and a monitor for visually displaying the shape represented by the inputted data. By visually representing the shape defined by the data inputted at the job-site, an operator may visually confirm that the shape shown on the monitor corresponds to the shape measured. Providing visual confirmation at the job-site allows an operator to correct any incorrect measurements prior to leaving the site.

BRIEF DESCRIPTION OF THE DRAWINGS

FIG. 1 shows a representative data input screen used in one embodiment of the present;

DESCRIPTION OF A PREFERRED EMBODIMENT

Figure 2:
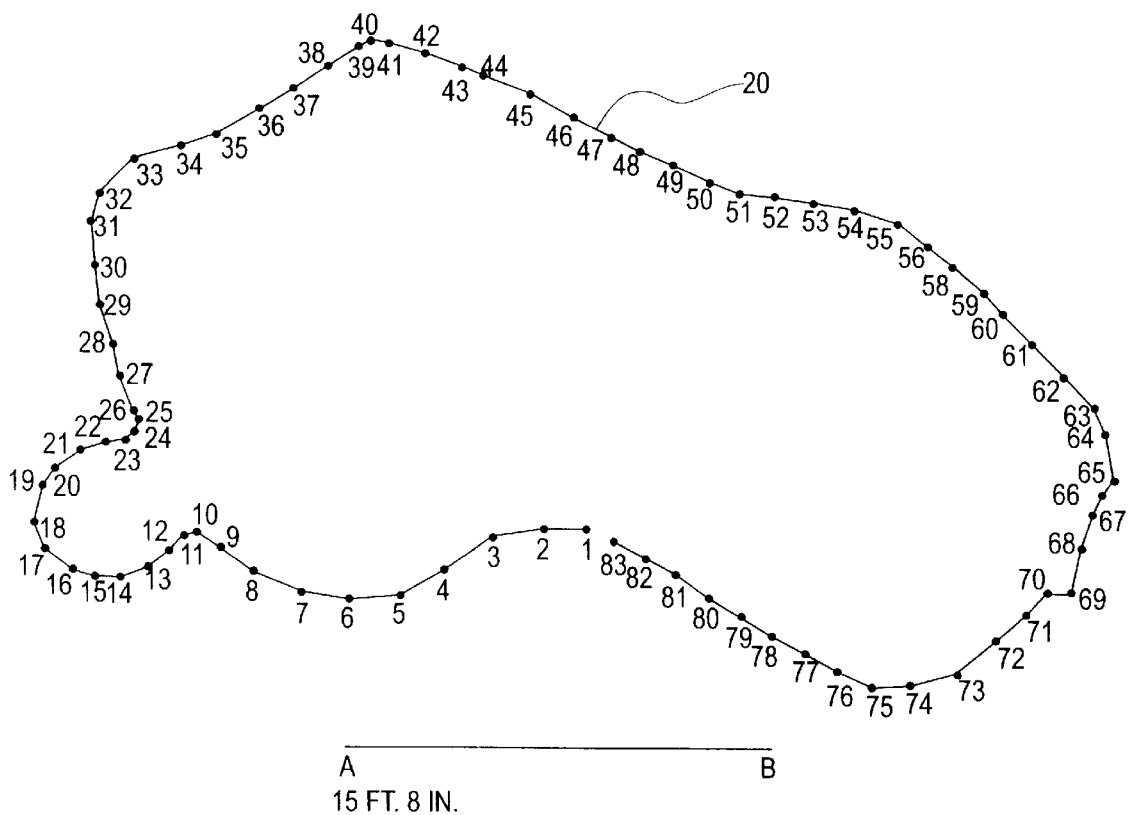
FIG. 2 shows a screen display visually indicating that correct measurement data has been inputted.

Prior to the development of the present invention, two-dimensional objects such as pool covers and the like were measured and manufactured in an extremely inefficient manner. To create a pool cover, an operator would first need to travel to the work-site and manually perform the tedious task of recording on paper the line measurements of the pool's shape. The measurements taken typically consisted of a series of measured distances from two spaced apart reference points that were then later used to create a cover corresponding to the shape of the pool at a manufacturing facility. Often, to record the measurements needed for a contoured pool cover, upwards of 100 individual measurements needed to be accurately taken and accurately recorded. Then, at the off-site location, the measurements needed to be accurately inputted. A single incorrect measurement or input at any stage of the process will produce an incorrect match between the object manufactured and the desired shape.

The current method used by the industry requires an operator to first manually record the line measurements of an object on a sheet of paper and to draw a sketch representing the shape of the object measured. The data obtained is then delivered to a manufacturing facility where the data is inputted into an Autometrics cutting machine.

The Autometrics machine, prior to production, visually displays a shape corresponding to the data inputted. If the shape shown on the display matches the hand sketch, there is no inaccuracies. If not, an operator must again travel to the work site and the entire process is repeated until the visual display matches the hand-drawn sketch.

Such procedures, when mistakes occur, are extremely costly and time-consuming. When a mistake occurs, an operator must first schedule another visit to the work site, which adds additional cost and delays production. Moreover, remeasuring at the work site still does not guarantee accurate measurements, since visual confirmation of the accuracy is only provided at the manufacturing site.

The present invention provides a device and method that allows an operator to obtain virtually error-free measurement data. While the present invention is particularly useful in the manufacture of pool covers, tarps, and the like, it also has applicability to other applications in which the shapes of two and three dimensional objects need to be recreated at a remote location.

As shown in FIGS. 1–4, the present invention achieves error-free measurement data by providing a microprocessor 10, such as a laptop computer, which is programmed to allow an operator to input the appropriate line measurements of the object's shape via a keyboard 12. The processor is further programmed to process the inputted data and to visually display the shape represented by the data on a monitor 14. The display is created on an ongoing bases as each individual reference point is inputted.

In use, an operator travels to the work site and inputs the line measurements of the object into the portable microprocessor. To assist the operator in organizing the inputted data, the microprocessor may be programmed to provide a screen frame in which inputted data may be easily organized. For example, as shown in FIG. 1, a screen display may request the operator to not only input the measurement data, but other important information such as the customer's identity and type of material to be used. As each measurement data is inputted, the inputted data is processed and used to create a reference point corresponding to the shape of the object that is displayed on the monitor. This may be done in a split-screen display. This allows the operator to determine if accurate information has been inputted for each individual measurement, and if not, allows re-measurement or input prior to repeating the procedure for the next reference point.

Figure 3:
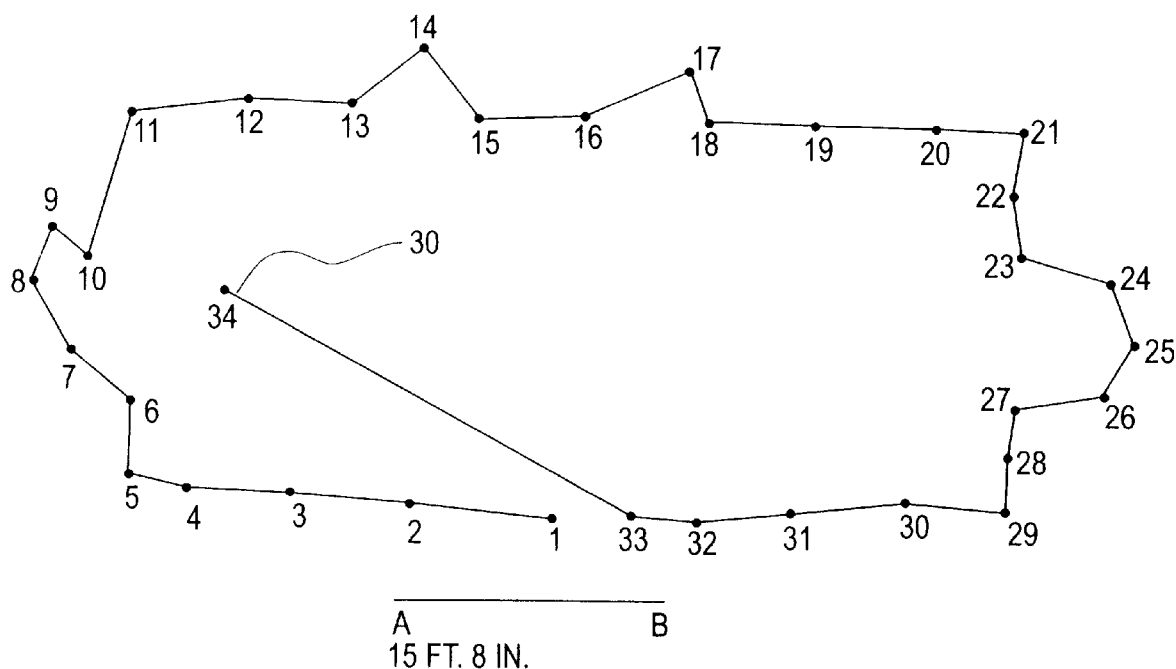
FIG. 3 shows a screen display visually showing that incorrect data has been inputted.
Figure 4:
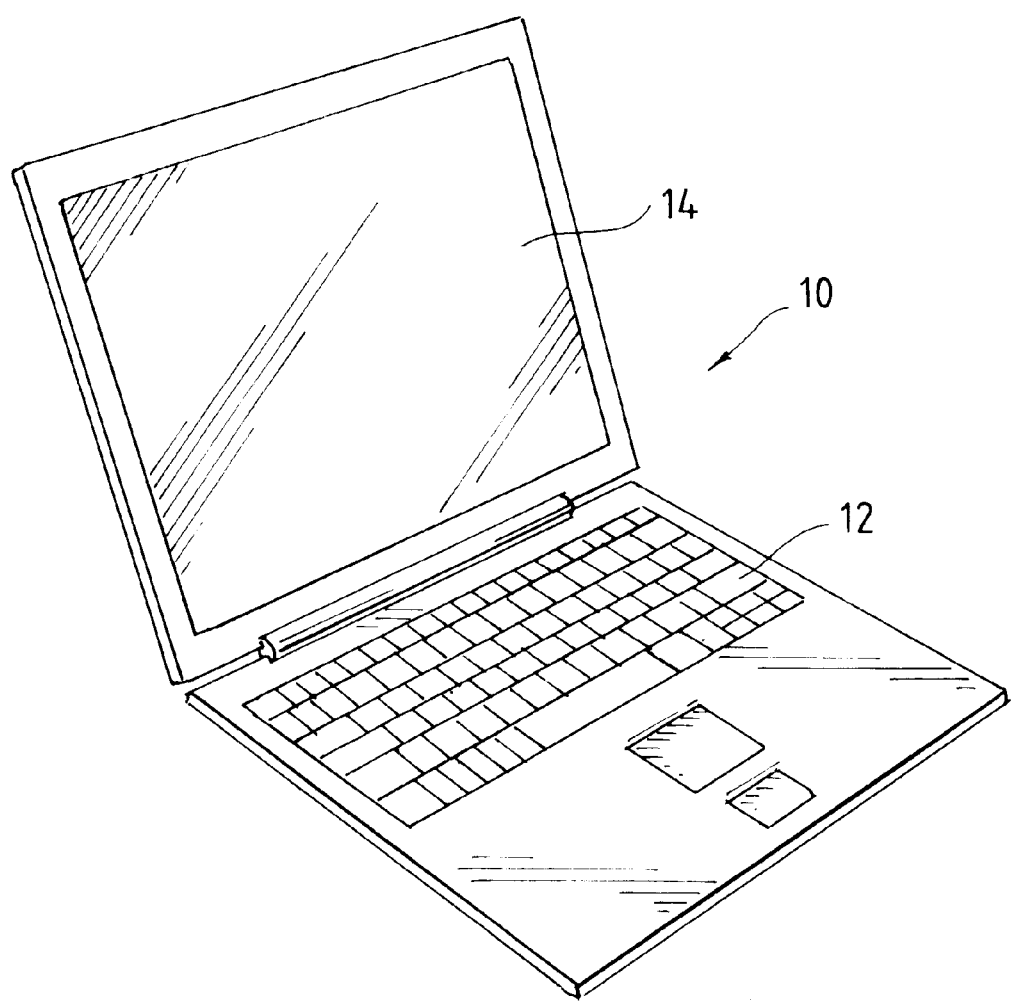
FIG. 4 is a perspective view of one embodiment of the invention.

By visually comparing the shape on the monitor with the actual shape of the object, an operator may immediately determine at the work site whether any inaccurate measurement was obtained or inputted. For example, as shown in FIG. 2, a properly entered data set accurately displays the shape 20 of the pool cover. However, as shown in FIG. 3, an inaccurate measurement will be easily noticed by the operator since an incorrect measurement 30 is easily noticed. Prior to leaving the work site, any necessary corrections may be made until an accurate visual representation is obtained. By visually verifying the resulting shape corresponding to the inputted data, a virtually error-free method of measuring the shape of an object is obtained.

Next, the operator may then store the inputted data on a storage device such as a diskette for subsequent downloading into machinery that will be used to construct the object. This will eliminate input errors. Alternatively, the inputted data may be electronically transmitted to the manufacturing site for use.

Electronically transmitting the verified information also allows operators to not only quickly and accurately process the data necessary to reconstruct the shape of an object, it also allows the information to be used between two geographically remote points. Such a system allows a manufacturer numerous economic benefits.

Currently available software from applicant, which is sold under the A-B VERIFIER™ trademark, may be used on currently available DOS-based microprocessors. In addition, the software may be further configured to perform the necessary operations to provide an on-the-work-site price quote.

It should be understood that various changes and modifications to the preferred embodiments described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A method of visually confirming at a work site the accuracy of measurements representing the shape of a pool for the creation of form fitted pool cover, comprising:

inputting into a microprocessor a plurality of measurements representing a plurality of reference points corresponding to the shape of the pool;

storing said measurements in said microprocessor;

using said microprocessor to process said inputted measurements and to individually display each of said plurality of reference points as connected line segments corresponding to said measurements on a monitor as said reference points are inputted; and visually confirming the accuracy of each of said measurements by comparing said image displayed on said monitor with the shape of the pool and upon visually confirming an incorrect measurement input, said processor allows an operator to input a second corrective data measurement.

2. The method of claim 1 wherein upon visually confirming an incorrect measurement input, said processor allows an operator to input a second corrective data measurement.

3. The method of claim 1 wherein said microprocessor highlights data to be corrected.

4. The method of claim 1 wherein said object is a pool cover.

5. The method of claim 1 wherein said object is two dimensional.

6. The method of claim 1 wherein said object is three dimensional.

7. A portable measuring device for inputting data representing the shape of a pool for the creation of a pool cover comprising:

a microprocessor for receiving a plurality of reference point measurement data corresponding to a shape of a pool;

a monitor in communication with said microprocessor, said monitor visually displays the location of each of said reference points as said reference points are inputted as connected line segments, whereby inaccurate measurement data may be visually recognized and corrected.

8. The device of claim 7 wherein said microprocessor is further adapted to notify a user when an incorrect measurement data is inputted.

9. The method of claim 1 wherein said microprocessor is adapted to notify a user when an incorrect measurement data is inputted.

* * * * *